United States Patent [19]
Katagiri et al.

[11] Patent Number: 5,597,214
[45] Date of Patent: Jan. 28, 1997

[54] BRAKE FORCE CONTROL DEVICE FOR A VEHICLE

[75] Inventors: Masayoshi Katagiri, Toyota; Kazuhiko Suzuki, Kariya, both of Japan

[73] Assignee: Aisin Seiki Kabushiki Kaisha, Kariya, Japan

[21] Appl. No.: 353,378

[22] Filed: Dec. 2, 1994

[30] Foreign Application Priority Data

Dec. 9, 1993 [JP] Japan .................................. 5-309532

[51] Int. Cl.$^6$ .................................................. B60T 13/16
[52] U.S. Cl. .......................... 303/10; 303/125; 303/162; 303/115.2
[58] Field of Search ..................... 303/125, 139, 303/142, 145, 162, 113.4, 115.2, 115.4, 10, 11, 3, 20, 16

[56] References Cited

U.S. PATENT DOCUMENTS

| | | | |
|---|---|---|---|
| 4,714,300 | 12/1987 | Heess et al. | 303/115.2 X |
| 4,938,543 | 7/1990 | Parker et al. | |
| 4,950,028 | 8/1990 | Harrison . | |
| 5,158,343 | 10/1992 | Reichelt et al. | 303/113.4 |
| 5,207,488 | 5/1993 | Newton et al. | 303/115.2 |
| 5,211,455 | 5/1993 | Matouka et al. | 303/115.2 |
| 5,219,213 | 6/1993 | Matouka et al. | 303/115.2 |
| 5,219,214 | 6/1993 | Savage et al. . | |
| 5,286,099 | 2/1994 | Fujita et al. | 303/125 |
| 5,456,524 | 10/1995 | Kashima et al. | 303/137 |

FOREIGN PATENT DOCUMENTS

| | | |
|---|---|---|
| 0470657 | 2/1992 | European Pat. Off. . |
| 0565153 | 10/1993 | European Pat. Off. . |
| 3-5270 | 1/1991 | Japan . |

*Primary Examiner*—Lee W. Young
*Attorney, Agent, or Firm*—Burns, Doane, Swecker & Mathis, LLP

[57] ABSTRACT

A brake force control device for a vehicle includes a master cylinder generating a brake pressure by operation of an operating member of the vehicle, a wheel brake for being mounted on a vehicle wheel and connected to the master cylinder through a conduit, a pressure control chamber connected to the wheel brake, a displacement actuator which varies the capacity of the pressure control chamber and an electric controller for operating the displacement actuator so as to supply the brake pressure to the wheel brake when the master cylinder does not generate the brake pressure.

5 Claims, 6 Drawing Sheets

BRAKE FORCE CONTROL DEVICE FOR A VEHICLE

BACKGROUND OF THE INVENTION

1. Field of the Invention

This invention relates to vehicle brake systems and more particularly, to a brake force control device for controlling the braking force imparted to the wheels of a vehicle.

2. Description of the Related Art

A conventional brake force control device for a vehicle is disclosed in Japanese Patent Laid Open No. 3(1991)-5270. A brake pressure circuit used in connection with a conventional brake force control device is shown in FIG. 6.

With reference to FIG. 6, the brake force control device for a vehicle comprises a master cylinder 100 operated by a brake pedal 101 to generate a brake pressure, a wheel brake 102 including a brake cylinder which brakes a wheel by the brake pressure, and a brake force control actuator 103. The brake force control actuator 103 includes a pressure control chamber connected to the brake cylinder and a displacement actuator which varies the capacity of the pressure control chamber.

The master cylinder 100 is connected to the wheel brake 102 by a conduit 104 having a first normally open solenoid valve 105 and a second normally open solenoid valve 106.

A first one way valve 107 which prevents brake fluid from flowing to the wheel brake 102 from the master cylinder 100 is provided in parallel arrangement with the first normally open solenoid valve 105. Further, a second one way valve 108 which prevents brake fluid from flowing to the master cylinder 100 from the wheel brake 102 is provided in parallel arrangement with the second normally open solenoid valve 106.

The displacement actuator installed in the brake force control actuator 103 is driven by an electric motor 103a to vary the capacity of the pressure control chamber. The first solenoid valve 105 is closed in order to separate the wheel brake 102 and the pressure control chamber from the master cylinder 100 when the wheel brake 102 is under an antilock condition. On the other hand, the second solenoid valve 106 is closed when the wheel brake 102 is under an antislip condition. At these times, the displacement actuator increases and decreases the capacity of the pressure control chamber. Therefore, the brake force control actuator 103 increases and decreases the brake pressure in the wheel brake 102 since the pressure control chamber is connected to the wheel brake 102.

Under the antislip condition, the brake fluid quickly flows into the wheel brake 102 from the master cylinder 100 through the second one way valve 108 when the vehicle needs to be stopped. Further, under the antilock condition, the brake fluid rapidly flows into the master cylinder 100 from the wheel brake 102 through the first one way valve 107 when the brake pedal is released.

In this known system, the wheel brake 102 is supplied with brake fluid only from the master cylinder 100.

Further, the frictional coefficient of the disc pad is designed to be low in order to prevent the disc pad from juddering. Therefore, a large amount of brake fluid needs to be used in the brake force control device because the area of the disc pad and the piston diameter of the disc brake must be increased so as to apply a brake force to a wheel effectively with the low frictional coefficient of the disc pad. Consequently, the brake force control device for a vehicle is expensive because of the required enlargement of the master cylinder diameter. Further, the brake force control device for a vehicle spoils the brake operation feeling because of the lengthened master cylinder stroke.

SUMMARY OF THE PRESENT INVENTION

It is an object of the present invention to provide a brake force control device for a vehicle which supplies a comfortable brake operation feeling to an operator.

It is another object of the present invention to provide a brake force control device for a vehicle which is small in size and light in weight.

It is a further object of the present invention to provide a brake force control device for a vehicle which can be easily manufactured.

It is a further object of the present invention to provide a brake force control device for a vehicle which is durable.

It is a further object of the present invention to provide a brake force control device for a vehicle which is simple in structure and low in cost.

To achieve the above mentioned objects, a brake force control device for a vehicle in accordance with this invention comprises a master cylinder for being operated by an operating member of the vehicle which generates a brake pressure, a wheel brake for being mounted on a vehicle wheel which is connected to the master cylinder through a conduit, a pressure control chamber connected to the wheel brake, a displacement actuator which varies the capacity of the pressure control chamber, and pressure apply means which operates the displacement actuator so as to supply the brake pressure to the wheel brake when the master cylinder does not generate the brake pressure.

BRIEF DESCRIPTION OF THE DRAWINGS

The features and advantages of the brake force control device for a vehicle according to the present invention will be more clearly appreciated from the following description considered in conjunction with the accompanying drawings wherein.

DETAILED DESCRIPTION OF PREFERRED EMBODIMENTS

Figure 1:
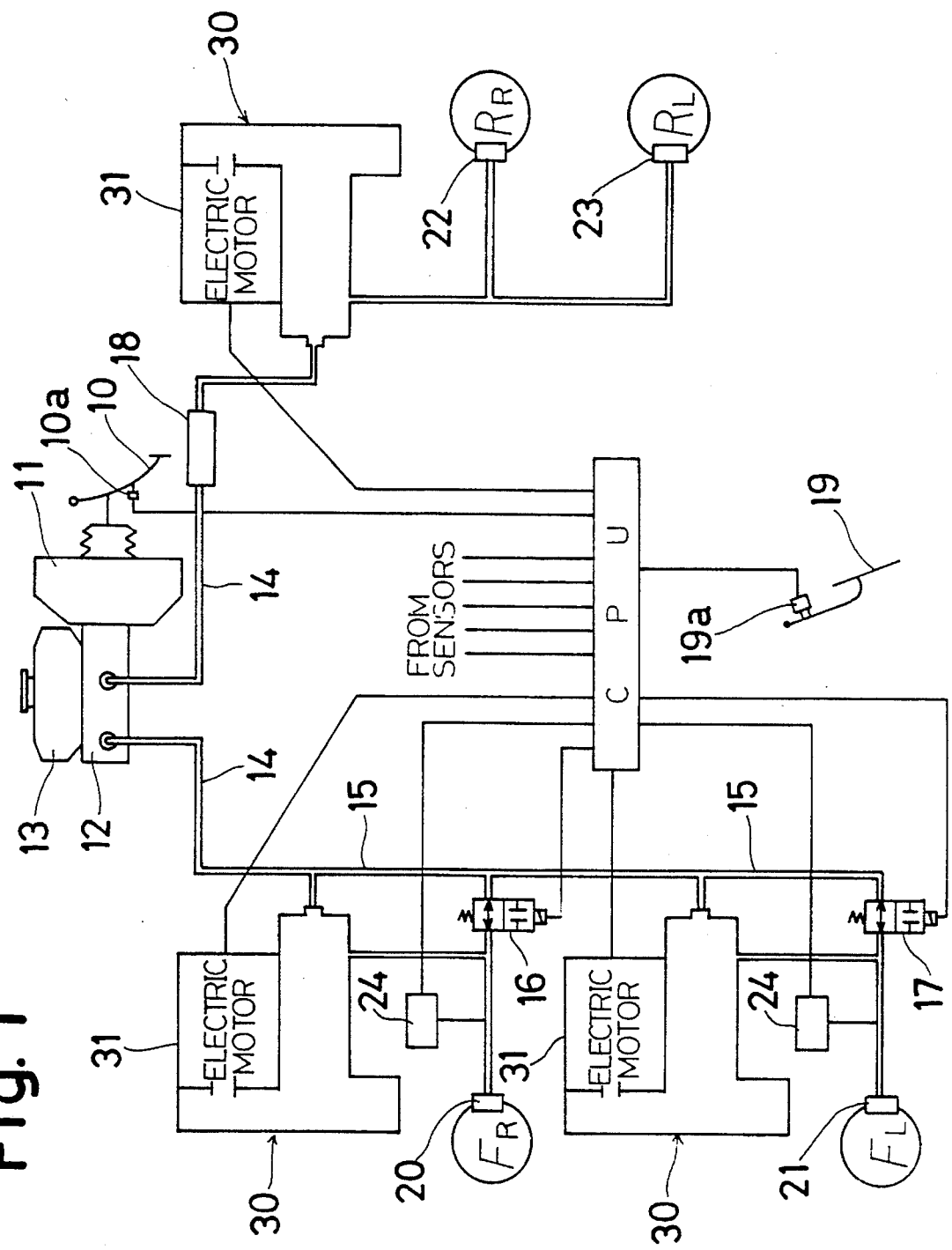
FIG. 1 is a circuit diagram of a brake force control device for a vehicle of the present invention.

In accordance with FIG. 1, a brake booster 11 is mounted on a vehicle body so as to be operated by a brake pedal 10. A master cylinder 12 connected to a reservoir tank 13 is fixed to the brake booster 11. A brake force generated by the brake pedal 10 is boosted by the brake booster 11 and transmitted to the master cylinder 12 in order to generate a brake pressure. A brake switch 10a is connected to the brake pedal 10.

Wheel brakes 20, 21, 22 and 23 which each brake a respective wheel FR, F, RR, and RL are connected to the master cylinder 12 through a pair of conduits 14. Displacement actuators 30 which are each driven by an electric motor 31 so as to vary the capacity of a pressure control chamber 36 (shown in FIG. 2) are hydraulically connected to the conduits 14. In accordance with this embodiment, the brake force control device for a vehicle comprises three displacement actuators 30 so that the brake force of each of the front wheels FR, FL is controlled independently of one another while the brake forces of the rear wheels RR, RL are controlled concurrently with each other.

A pair of bypass conduits 15 is connected to the respective front wheel side conduits 14 so as to be in parallel arrangement with each of the displacement actuators 30. Normally open type solenoid valves 16, 17 are disposed on the respective bypass conduits 15. The solenoid valves 16, 17 are controlled by an electric controller CPU. The electric controller CPU controls the operations of the electric motors 31 to control the brake forces of the wheels FR, FL, RR and RL based on conditions of the wheels RF, FL, RR and RL detected by wheel sensors (not specifically shown).

A conventional proportioning valve 18 is disposed on the rear wheel side conduit 14 between the master cylinder 12 and the displacement actuator 30 disposed in the rear side conduit 14. An accelerator switch 19a is fixed on an accelerator pedal 19 for controlling a drive torque of the engine (not specifically shown) so as to detect an operation of the accelerator pedal 19.

Pressure switches 24 are fixed on the conduits 14 and are each disposed near the wheel brakes 20, 21 mounted on the front wheels FR, FL. Each of the pressure switches 24 is turned on when it detects the pressure level of 2 kgf/cm$^2$ and 0 kgf/cm$^2$ in the wheel brakes 20, 21.

In accordance with FIGS. 2 and 3, details of a first embodiment of the displacement actuator 30 will be described hereinafter. The displacement actuator 30 includes a housing 32, a plunger 33 slidably disposed in the housing 32 and movable through operation of the electric motor 31, a first valve 34 and a second valve 35. The housing 32 includes a stepped cylinder portion 32a in which the plunger 33 is fit so as to be able to move in the axial direction thereof. The plunger 33 and the cylinder portion 32a form the pressure control chamber 36.

The plunger 33 is formed with a first plunger 33a and a second plunger 33b which is located inside the first plunger 33a. The first plunger 33a having a seal cup 37 is slidably disposed in the cylinder portion 32a. The first plunger 33a is always biassed downwardly by a spring 38 shown in FIG. 2 so as to engage with at least one of a step portion 32a' of the cylinder portion 32a and a step portion 33b' of the second plunger 33b.

Figure 2:
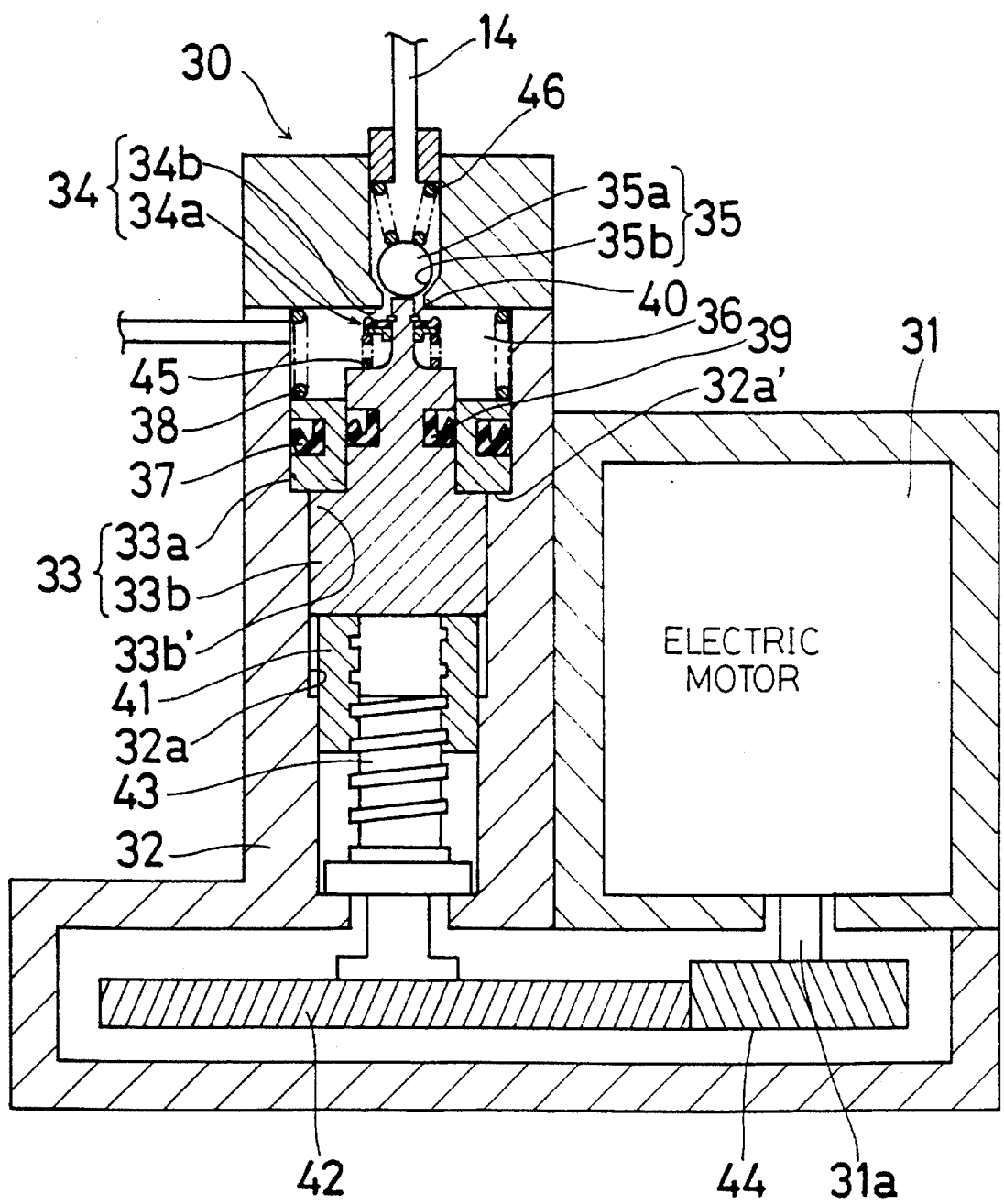
FIG. 2 is a sectional view of a first embodiment of a displacement actuator of the brake force control device for a vehicle of the present invention.
Figure 3:
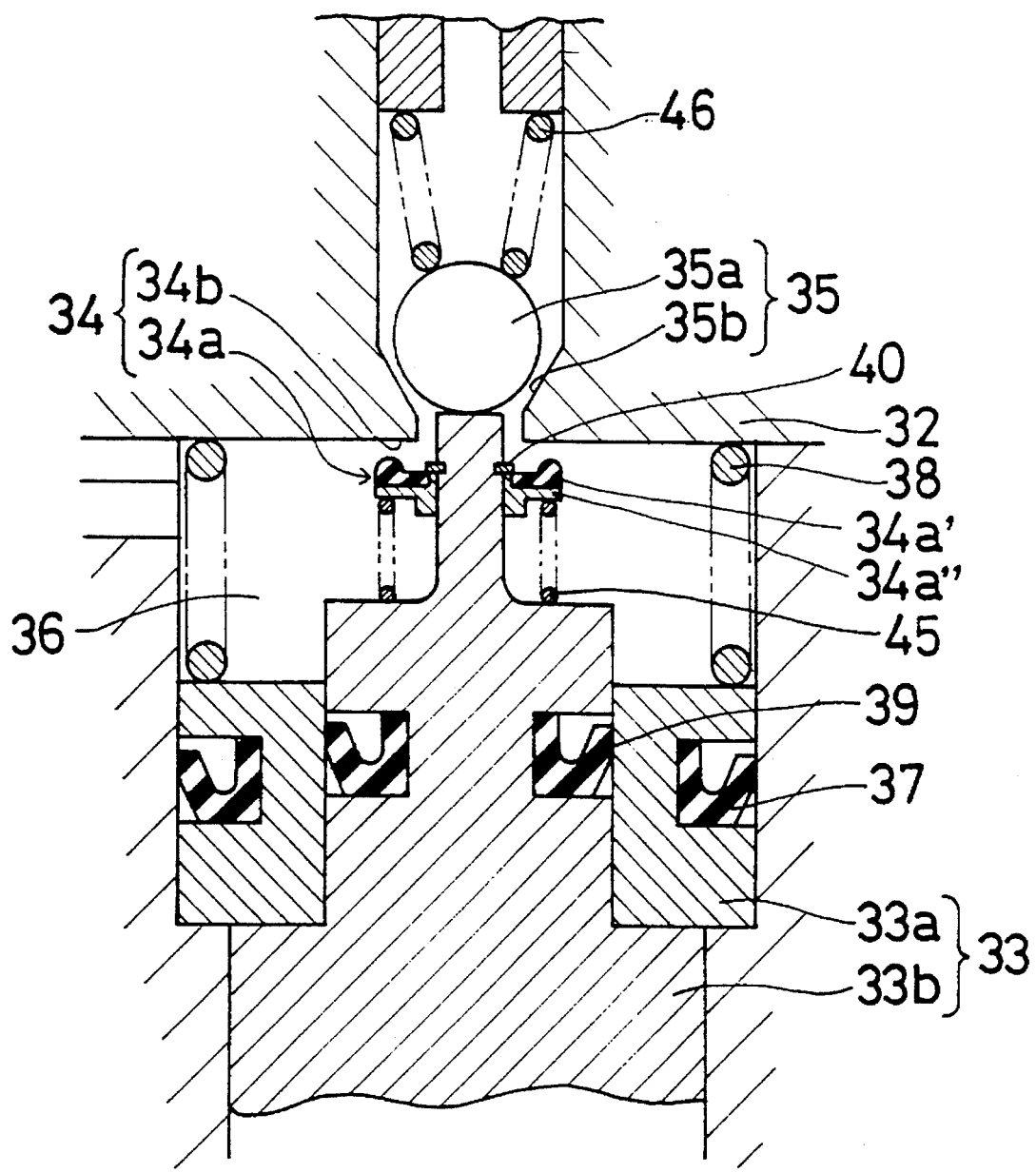
FIG. 3 is an enlarged detailed sectional view of a displacement actuator shown in FIG. 2.

The second plunger 33b is formed with a large diameter portion, a medium diameter portion and a small diameter portion as shown in FIG. 2. The large diameter portion slidably fits in the cylinder portion 32a. The medium diameter portion having a seal cup 39 mounted on an outer periphery portion thereof is slidably fit into the inside of the first plunger 33a. The small diameter portion has an engagement member 40 as shown in FIG. 3 which is fixed on an outer peripheral portion thereof to hold a valve member 34a of the first valve 34. Further, the second plunger 33b is retained by a nut member 41 so as to be moved in the vertical direction shown in FIG. 2 by movement of the nut member 41.

The nut member 41 meshes with a screw member 43 which rotates integrally with a first wheel gear 42 so as to be moved in the vertical direction. The first wheel gear 42 engages with a second wheel gear 44 which is fixed on an output shaft 31a of the electric motor 31. Therefore, the rotation of the electric motor 31 is transmitted to the nut member 41 through the second wheel gear 44, the first wheel gear 42 and the screw member 43 so as to move the second plunger 33b in the vertical direction.

The valve member 34a is formed with an elastic member 34a' which can contact a valve seat 34b and a holder 34a" holding the elastic member 34a'. The valve member 34a is forced toward the engagement member 40 by a spring 45 as seen in FIG. 3.

On the other hand, the second valve 35 is formed with a taper shaped valve seat 35b and a ball valve member 35a which is biassed toward the valve seat 35b by a spring 46.

The operation of the brake force control device for a vehicle of the above embodiment will be described hereinafter. The plungers 33 are located at an initial position as shown in FIGS. 2 and 3 and the solenoid valves 16, 17 are opened when the vehicle is in operation. When the electric controller CPU determines that a need exists to decrease the vehicle speed as a result of having received and reviewed signals from a distance sensor detecting an interval to a front vehicle, a speed sensor, a sensor detecting that a driver is dozing, a sensor detecting a front obstacle and so on, the solenoid valves 16, 17 are closed and the electric motor 31 of each of the displacement actuators 30 is driven in the positive direction so as to move the first and second plungers 33a, 33b in the upward direction with respect to the view shown in FIG. 2 (Auto brake condition). Therefore, the first valve 34 is closed so as to separate the pressure control chamber 36 and the wheel brakes 20, 21, 22 and 23 from the master cylinder 12. The capacity of each of the pressure control chambers 36 decreases so as to increase the fluid pressure in each of the pressure control chambers 36 and each of the wheel brakes 20, 21, 22 and 23 when the first and second plungers 33a, 33b move further in the upward direction.

At this moment, when the driver operates the brake pedal 10, a fluid pressure is generated in the master cylinder 12. When a bias force applied to each of the first valves 34 from the fluid pressure in the master cylinder 12 is larger than the sum of the elastic force of the spring 45 and the pressure force of the fluid pressure in the pressure control chamber 36, the first valve 34 is opened so as to transmit the fluid pressure in the master cylinder 12 to each of the wheel brakes 20, 21, 22 and 23.

When the driver operates the brake pedal 10 as a normal braking operation, the fluid pressure generated in the master cylinder 12 is transmitted to the wheel brakes 20, 21, 22 and 23 to brake the wheels FR, FL, RR and RL.

When the electric controller CPU detects a wheel lock condition because of an excessive brake force applied to each of the wheels FR, FL, RR and RL on a snowy road, a frozen road, or the like, the corresponding solenoid valves 16, 17 are closed and the electric motors 31 of the corresponding displacement actuators 30 are driven in the negative direction to move the second plunger 33b in the downward direction (Antilock condition). Therefore, the second valve 35 is closed so as to separate the pressure control chamber 36 and the corresponding wheel brakes 20, 21, 22 and 23 from the master cylinder 12. The capacity of the pressure control chamber 36 increases so as to decrease the fluid pressure in the pressure control chamber 36 and the corresponding wheel brakes 20, 21, 22 and 23 when the second plunger 33b moves further in the downward direction. Consequently, the brake force applied to the corresponding wheels FR, FL, RR and RL is decreased so that each of the wheels FR, FL, RR and RL is able to grasp the road.

At this moment, when the driver releases the brake pedal 10, the fluid pressure in the master cylinder 12 is decreased. Therefore, when a force which is generated by the pressure differential between the pressure control chamber 36 and the master cylinder 12 is larger than the elastic force of the spring 46, the second valve 35 is opened to decrease the fluid pressure in the wheel brakes 20, 21, 22 and 23.

When the electric controller CPU detects a wheel slip condition because of an excessive driving force applied to the driving wheels RR, RL on a snowy road, frozen road, or the like, the electric motor 31 of the driving wheel side displacement actuator 30 is driven in the positive direction to move the first and second plungers 33a, 33b in the upward direction (Antislip condition). Therefore, the first valve 34 is closed to separate the pressure control chamber 36 and the driving wheel brakes 22 and 23 from the master cylinder 12. The capacity of the pressure control chamber 36 decreases so as to increase the fluid pressure in the pressure control chamber 36 and the driving wheel brakes 22 and when the first and second plungers 33a, 33b move further in the upward direction. Consequently, the driving force applied to each driving wheel RR, RL is decreased so that the driving wheels RR, RL are able to grasp the road.

Figure 4:
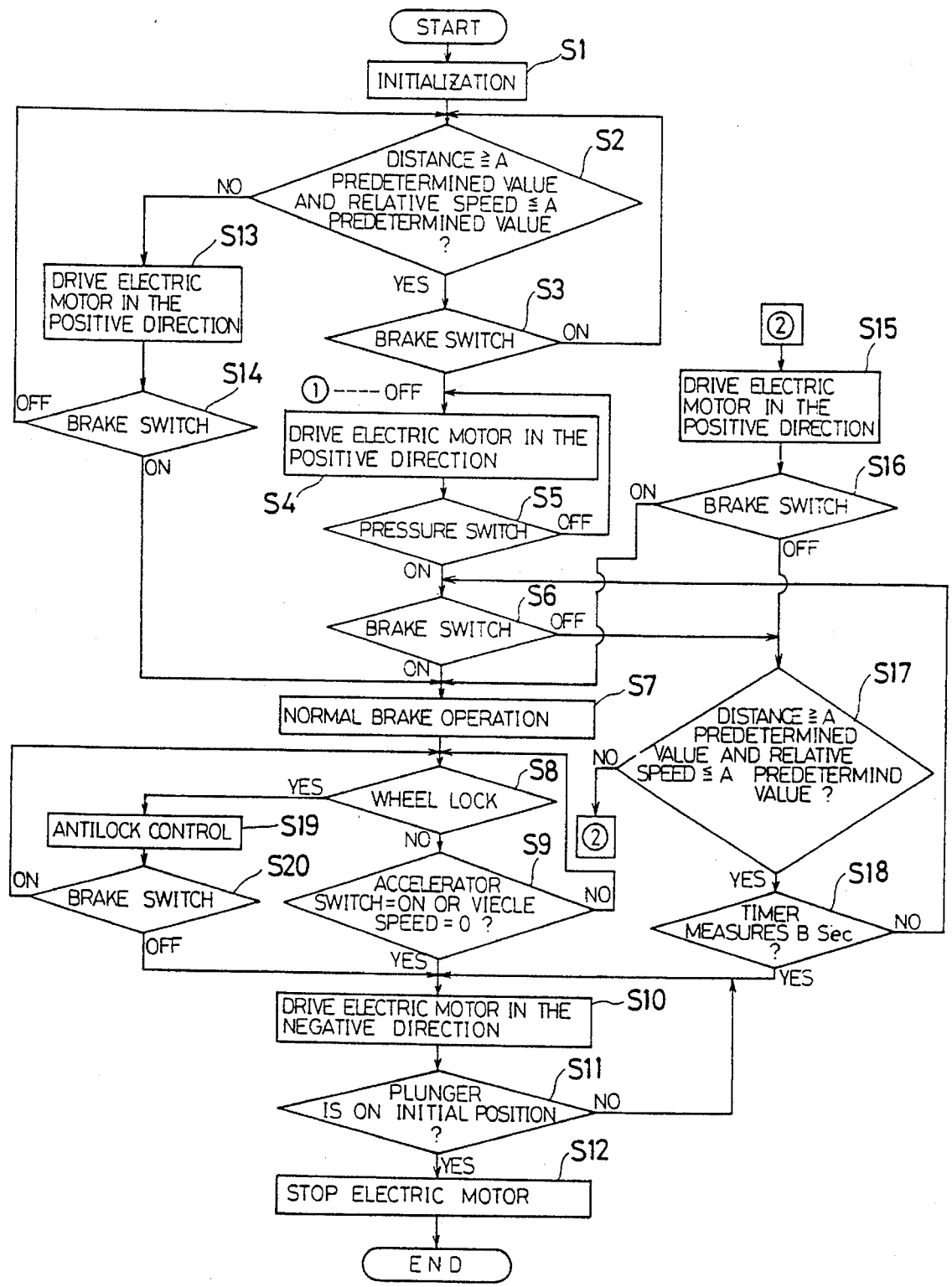
FIG. 4 is a flow chart showing an operation of the brake force control device for a vehicle of the present invention.

In accordance with FIG. 4, an operation of the electric controller CPU will be described hereinafter. The electric controller CPU is initialized at step S1 when electric power is supplied to the electric controller CPU.

The interval or distance to the front vehicle and the vehicle speed relative to the front vehicle is determined by the distance sensor and the speed sensor at step S2. When the interval or distance to the front vehicle is smaller than a predetermined value and the vehicle speed relative to the front vehicle is higher than a predetermined value, each of the electric motors 31 is driven in the positive direction at step S13 to brake the wheels FR, FL, RR and RL. The electric controller CPU determines whether or not the brake switch 10a is ON at step S14. When the brake switch 10a is OFF, the program returns to step S2. Later, each of the electric motors 31 is driven in the positive direction until it is determined that the interval to the front vehicle is larger than a predetermined value and the vehicle speed relative to the front vehicle is lower than a predetermined value. Further, when the brake switch 10a is ON at step S14, the program proceeds to step S7 to perform a normal brake operation.

On the other hand, when it is determined at step S2 that the interval to the front vehicle is larger than a predetermined value and the vehicle speed relative to the front vehicle is lower than a predetermined value, the electric controller CPU determines whether or not the accelerator switch 19a is ON. When the accelerator switch 19a is ON, the program returns to step S2. When the accelerator switch 19a is OFF, the program proceeds to step S4 to drive the electric motors 31 in the positive direction. Further, the electric controller CPU determines at step S5 whether or not the pressure switches 24 are ON. When the pressure switches 24 are OFF, the program returns to step S4 to further drive the electric motors 31 in the positive direction. Therefore, brake pressure is generated in the wheel brakes 20, 21. When the pressure switches 24 are turned ON by 2 kgf/cm² brake pressures (Pre-applied pressure) in the wheel brakes 20, 21, the program proceeds to step S6.

The electric controller CPU determines at step S6 whether or not the brake switch 10a is ON. When the brake switch 10a is ON, the program proceeds to step S7 so as to brake the wheels FR, FL, RR and RL by the brake pedal 10. When the brake switch 10a is OFF, the program proceeds to step S17 in order to determine the interval or distance to the front vehicle and the vehicle speed relative to the front vehicle. When the interval to the front vehicle is smaller than a predetermined value and the vehicle speed relative to the front vehicle is higher than a predetermined value, the program proceeds to step S15 so as to drive the electric motors 31. Therefore, brake pressure is generated in the wheel brakes 20, 21.

The electric controller CPU determines at step S16 whether or not the brake switch 10a is ON. When the brake switch 10a is ON, the program returns to step S7 so as to brake the wheels FR, FL, RR and RL. When the brake switch 10a is OFF, the program proceeds to step S17 to determine the interval to the front vehicle and the vehicle speed relative to the front vehicle. The electric motors 31 are driven in the positive direction at step S17 until the interval to the front vehicle is larger than a predetermined value and the vehicle speed relative to the front vehicle is lower than a predetermined value or the brake switch 10a is turned ON. When it is determined at step S17 that the interval to the front vehicle is larger than a predetermined value and the vehicle speed relative to the front vehicle is lower than a predetermined value, the program proceeds to step S18 so as to determine whether B sec is measured by a timer (not shown in drawing figures) after the electric controller CPU determines the accelerator switch 19a is OFF (1). When the B sec is not measured by the timer, the program returns to step S6. On the other hand, when the B sec is measured by the timer, the program proceeds to step S10.

At step S8, the electric controller CPU determines whether or not the wheels FR, FL, RR and RL are under the wheel lock condition. When the wheel lock condition of the wheels FR, FL, RR and RL is determined by the wheel sensors fixed on the wheels FR, FL, RR and RL, the program proceeds to step S19 so as to conduct an antilock control. The electric controller CPU determines at step S20 whether or not the brake switch 10a is ON. When the brake switch 10a is ON, the program returns to step S8. When the brake switch 10a is OFF, the program proceeds to step S10. The antilock control is performed until at least one of the cancellation of the wheel lock condition or release of the brake pedal 10 is determined.

The electric motors 31 are driven in the negative direction at step S10 so as to return the plungers 33 to the initial positions. When the electric controller CPU determines the plungers 33 are positioned at the initial positions at step S11, the program proceeds to step S12 so as to stop the driving operation of the electric motors 31. When the pressure switches 24 are turned ON by 0 kgf/cm² brake pressures in the wheel brakes 20, 21, the electric controller CPU determines the plungers 33 are positioned at the initial positions so as to stop the driving operation of the electric motors 31.

In accordance with the above embodiment, because the brake pressures which bias the disc pads to be contacted with a disc rotor are generated in the wheel brakes 20, 21 by the displacement actuators 30, the master cylinder 12 does not need to supply a large amount of brake fluid. Therefore, the diameter and the stroke of the master cylinder 12 are prevented from being enlarged. Consequently, the master cylinder 12 can be low in cost. Further, the master cylinder 12 can maintain the comfortable brake operation feeling.

Further, the disc pad is prevented from being extremely or excessively worn because the displacement actuators 30 operate when the brake pedal 19 is released.

Further, the disc pad is prevented from being abrasively worn although an engine brake force is applied to the wheels FR, FL because the pre-applied pressure is generated for only B sec.

Further, the plungers 33 are easily returned to the initial positions because the electric controller CPU determines the plungers 33 are positioned at the initial positions so as to stop the driving operation of the electric motors 31 when the pressure switches 24 are turned ON by 0 kgf/cm$^2$ brake pressures in the wheel brakes 20, 21.

Figure 5:
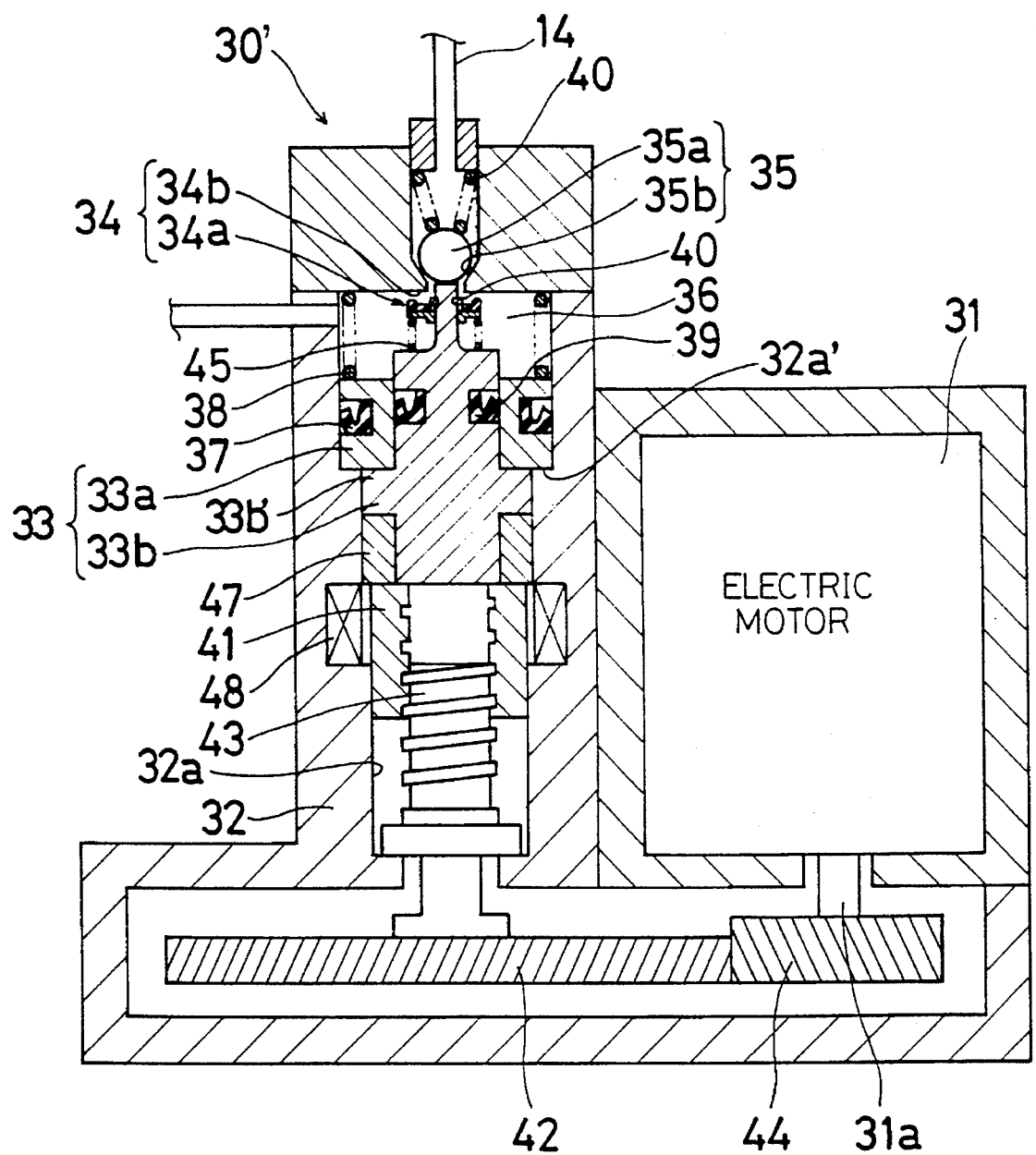
FIG. 5 is a sectional view of a second embodiment of a displacement actuator of the brake force control device for a vehicle of the present invention.
Figure 6:
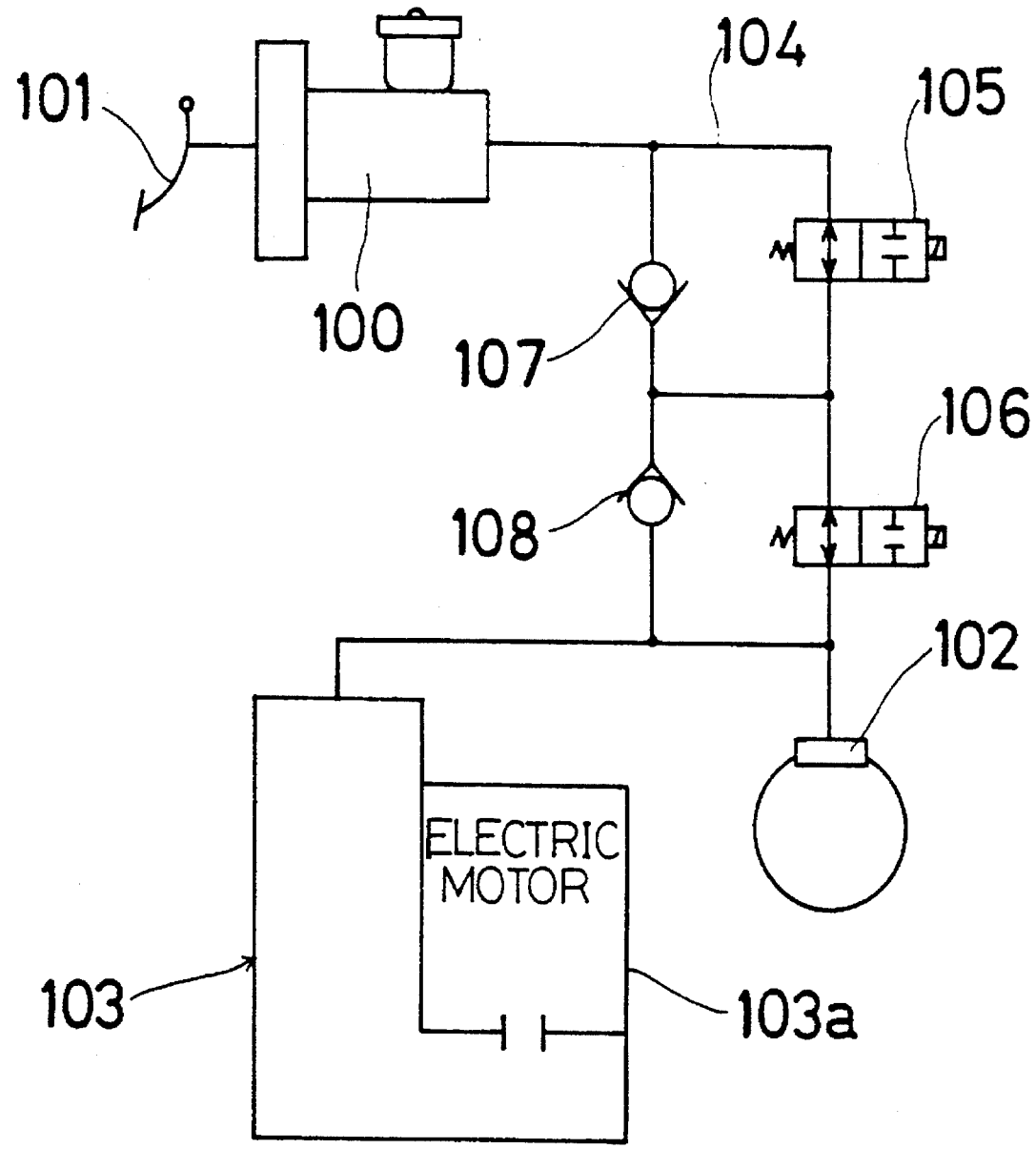
FIG. 6 is a circuit diagram of a conventional brake force control device for a vehicle.

A sectional view of a second embodiment of the displacement actuator 30' of the invention is shown in FIG. 5. In accordance with FIG. 5, the features which have been described above are not once again described here. A permanent magnet 47 is fixed to a lower end of the second plunger 33b. A solenoid 48 is installed in the housing 32 so as to be located under the permanent magnet 47.

In accordance with the second embodiment, an electric current is applied to the solenoid 48 in order that an upper portion of the solenoid 48 has the same polarity as a lower portion of the permanent magnet 47. Therefore, the solenoid 48 includes a repulsive force against the permanent magnet 47 so as to move the second plunger 33b in the upper direction. The movement of the second plunger 33b is controlled by the amount of the electric current or an electric voltage applied to the solenoid 48. In accordance with the above embodiment, the frequency of operation of the electric motor 31 can be small so that the electric motor 31 is durable.

While the invention has been particularly shown and described with reference to preferred embodiment thereof, it will be understood by those skilled in the art that the foregoing and other changes in form and details can be made therein, and equivalents employed, without departing from the spirit and scope of the invention.

What is claimed is:

1. A brake force control device for a vehicle that includes an accelerator pedal and a brake pedal comprising:

a master cylinder for generating a brake pressure by operation of the brake pedal;

a wheel brake for being mounted on a vehicle wheel and connected to the master cylinder through a conduit;

a pressure control chamber connected to the wheel brake;

a displacement actuator which varies the capacity of the pressure control chamber; and pressure apply means for starting operation of the displacement actuator to supply a predetermined brake pressure to the wheel brake whenever the brake pedal is not operated and the accelerator pedal is released.

2. A brake force control device for a vehicle as recited in claim 1, wherein the displacement actuator includes a plunger which varies the capacity of the pressure control chamber and plunger drive means for driving the plunger.

3. A brake force control device for a vehicle as recited in claim 2, wherein the displacement actuator includes a housing in which the plunger is disposed, a permanent magnet fixed to the plunger and a solenoid installed in the housing for generating a repulsive force against the permanent magnet when an electric current is applied to the solenoid.

4. A brake force control device for a vehicle as recited in claim 1, wherein the pressure apply means includes a timer for measuring a plunger operation time.

5. A brake force control device for a vehicle as recited in claim 1, wherein the brake force control device for a vehicle further comprises a pressure switch which detects a brake pressure in the wheel brake and which sends a signal to the pressure apply means when the brake pressure in the wheel brake is at a predetermined value, the pressure apply means operate and stop the displacement actuator by receiving the signal from the pressure switch.

* * * * *